2,762,599

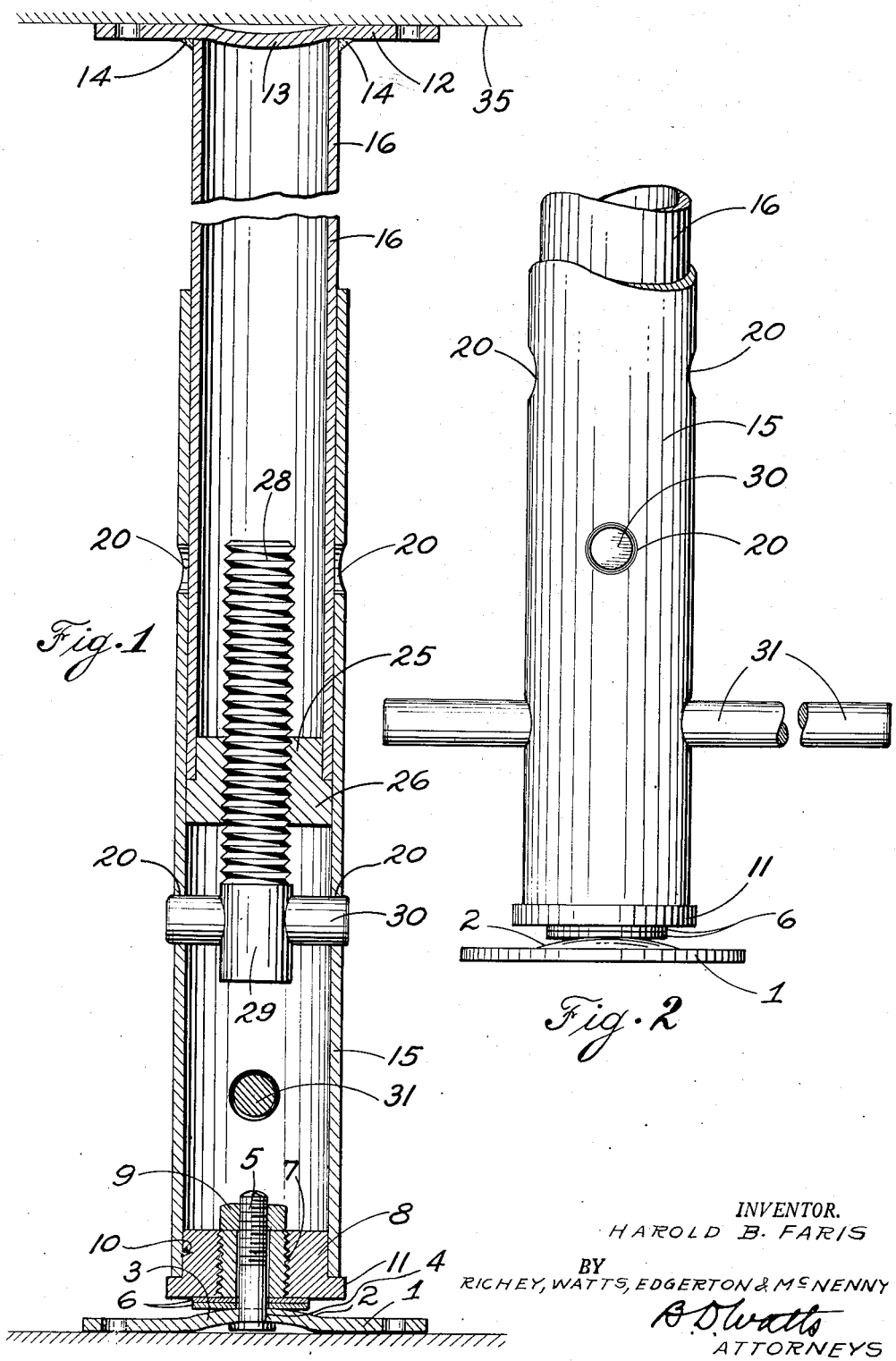

Patented Sept. 11, 1956

2,762,599

ADJUSTABLE POST

Harold Bailey Faris, Akron, Ohio, assignor to The Wolfe Products, Inc., Akron, Ohio, a corporation of Ohio Application November 18, 1952, Serial No. 321,137

1 Claim. (Cl. 248—354)

This invention relates generally to the art of adjustable supports, and is particularly concerned with a new adjustable post consisting of a new combination of parts having a new mode of operation and giving new results.

In the drawings accompanying and forming a part of this specification,

Fig. 1 is a vertical central view taken through one form of post embodying the present form of invention, and Fig. 2 is a fragmentary side elevational view of the lower portion of the post of Fig. 1 taken at right angles to that figure.

The device illustrated in the drawings comprises top and bottom plates, inner and outer telescopic pipes mounted on said plates and a screw having threaded engagement with a nut in one end of the inner pipe and having a pin support in the outer pipe.

The bottom plate 1 is generally rectangular with a central portion 2 deformed out of the plane of the remainder thereof and having a rounded top surface 3 and provided with a hole 4 to receive a threaded bolt 5, the head of which is larger than the hole in the plate and thin enough to be received in the concavity formed by the deformed central portion 2. Two metal washers 6 surround the lower bolt 5 and rest on the rounded top surface 4 of bottom plate 1 for a purpose presently to appear.

Each bolt 5 extends through a plug comprising a tubular bushing 7 which extends through and is fixed in a casting 8. Nut 9, on the bolt 5, secures the plug rotatably to the plate in place on the top washer 6.

Casting 8 has a cylindrical, longitudinally extending side wall 10 and an outwardly projecting flange 11. The lower end of outer pipe 15 has a pressed fit with the cylindrical wall 10 of casting 8 and rests at its lower edge on the upper surface of flange 11. The outer pipe 15, bushing 7 and casting 8 are fixed against movement relative to each other but these parts may rotate freely as a unit about lower bolt 5 and may tilt relative to that bolt by reason of the space between the bushing 7 and the bolt 5 and the position of the washers 6 on the rounded surface 3 of the bottom plate 1. The top plate 12 is generally rectangular and preferably has a central, deformed disk-like portion 13. The upper end of inner pipe 16 is secured to plate 12 against relative rotation, as may be done, preferably, by welding as indicated at 14.

Outer pipe 15 has a plurality of pairs of diametrically arranged holes 20. The lower end of inner pipe 16 is provided with a nut 25 which has a cylindrical portion having a pressed fit with the inner surface of that pipe, and having an outstanding flange 26 to bear against the end surface of the pipe. This flange is slightly less in outside diameter than the inside diameter of the outer pipe 15. Nut 25 is threaded to receive screw 28 which has a cylindrical lower portion 29 provided with a transversely extending hole to receive pin 30 which is slightly greater in length than the diameter of the outside pipe 15 and has a diameter slightly less than that of holes 20. A rod 31 having a diameter slightly less than that of holes 20 and a length sufficient to project well beyond opposite sides of the outer pipe 15 serves as a lever for turning the outer pipe and thereby adjusting the length of the post.

From the foregoing description it will be understood that the device shown in the drawings will operate as follows: The lower part of the post comprising plate 1, bolt 5, washers 6, bushing 7, casting 8 and outer pipe 15 is placed in erect position with plate 1 resting on a supporting foundation, for example, the floor of a basement or a pier in the basement of a building, such as a house. The upper unit comprising inner pipe 15, nut 25, screw 28 and plate 12 is assembled with the unit by placing pipe 16 in pipe 15 and raising pipe 16 until plate 12 comes into actual or approximate contact with the under surface 35, of an overhead structure, for example, a floor beam in a house or other building. With the parts assembled in that position pin 30 is passed through the pair of holes 20 adjacent to the hole through the lower end 29 of screw 28, thus securing the two units in assembled position. Then lever 31 is passed through another pair of holes 20 and the lower post is rotated about its bolt 5 and non-rotatable pipe 16 by means of this lever.

The turning force exerted on lower pipe 15 will rotate it relative to inner pipe 16 and such relative rotation will move the nut 25 upwardly on screw 28 thereby exerting increasing force on surface 35. The device may be disassembled by reversing the foregoing procedure.

It will be understood that the illustrated apparatus has several important advantages. The device may be sold and shipped as a packaged unit. The parts may be readily assembled and disassembled and cannot be incorrectly assembled. The fact that the outer pipe has a long telescoped bearing on the inner pipe insures strength against buckling at the central portion of the post, and also insures the minimum friction to relative rotational movement of the two pipes. The fact that the lever 31 extends through the outer pipe which is mounted for rotational movement on the washers 6, and that the screw is effectively connected by pin 30 to pipe 15, gives high mechanical advantage as compared with conventional posts where the turning lever is inserted in the screw, and thus greatly reduces the effort which is required to rotate the screw. The fact that the pin 30 is positioned in a pair of holes in the outer pipe remote from either of its ends is an assurance against splitting of the pipe when heavy forces are applied to it. Since the screw is wholly enclosed in the pipes, there is no possibility of personal injury traceable to contact with the screw; and since the pin 30 is held in place by the weight supported by the post, that pin cannot be dislodged without special tools. As a result, when the post is in use children cannot be injured by it and cannot alter its adjustment. Thus the post of the present invention is suited to use in dwelling houses.

These advantages and others which will be apparent to those skilled in the art result in a new mode of operation and new results of the posts embodying the present invention.

Having thus described this invention so that others skilled in the art may be able to understand and practice the same, I state that what I desire to secure by Letters Patent is defined in what is claimed.

What is claimed is:

An adjustable post comprising an outer pipe having a plurality of pairs of diametrically arranged holes, a bottom plate below the lower end of said pipe and having an upper convex surface, a plug having a shoulder engaging the lower end of said outer pipe and a portion of reduced diameter extending into the pipe and having close fitting engagement with the inner surface of the latter, a bushing fixed in the plug and means rotatably and tiltably connecting said plug and bushing to said bottom plate, said means including a bolt extending through said bottom plate and said bushing, there being a space between said bolt and bushing, and washers on the bolt and engaging said convex surface and the flat bottom surface of the plug and bushing, an inner elongated pipe extending into and having a long telescoped bearing on the inner surface of said outer pipe, a top plate at the upper end of said inner pipe, weld metal connecting the upper end of said inner pipe to said top plate, a threaded nut having a shouldered portion bearing on the lower end of said inner pipe and a portion of reduced diameter extending into and having close fitting engagement with the inner surface of said pipe, said nut having a screw-threaded opening therethrough, a screw carried by said nut, having a stem portion in threaded engagement with the threads in said opening in the nut and an unthreaded portion terminating adjacent to the nut and provided with a pin receiving hole alignable with any one of the several pair of holes in said outer pipe, a short pin extending through the hole in said screw and openings in the lower pipe aligned therewith and terminating adjacent to the outer surface of the latter, the lowermost pair of diametrically arranged holes in said outer pipe being adapted to receive a readily removable long rod for rotating the outer pipe around the inner pipe and rotating the screw relative to said nut.

References Cited in the file of this patent

UNITED STATES PATENTS

| | | |
|---|---|---|
| 1,409,755 | Morrow | Mar. 14, 1922 |
| 1,951,660 | Klaudt | Mar. 20, 1934 |
| 2,535,141 | Kenney | Dec. 26, 1950 |
| 2,687,268 | Hawes | Aug. 24, 1954 |

FOREIGN PATENTS

| | | |
|---|---|---|
| 165,746 | Switzerland | Dec. 15, 1933 |
| 503,073 | Belgium | May 31, 1951 |